Figure 1:
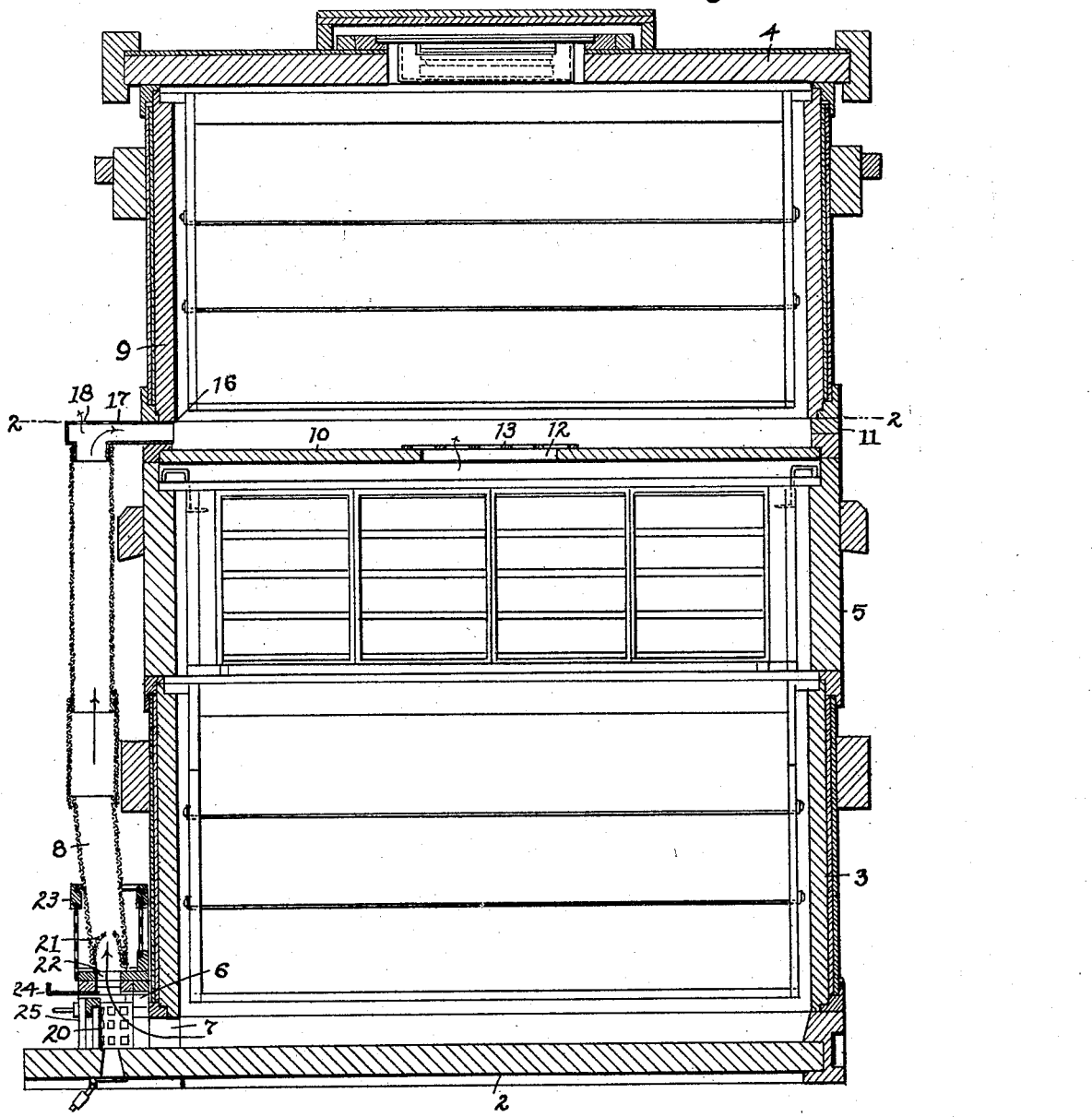

G. C. RAHN.
BEEHIVE.
APPLICATION FILED JULY 21, 1913.

1,116,922.

Patented Nov. 10, 1914.
2 SHEETS—SHEET 1.

G. C. RAHN.
BEEHIVE.
APPLICATION FILED JULY 21, 1913.
1,116,922.
Patented Nov. 10, 1914.
2 SHEETS—SHEET 2.
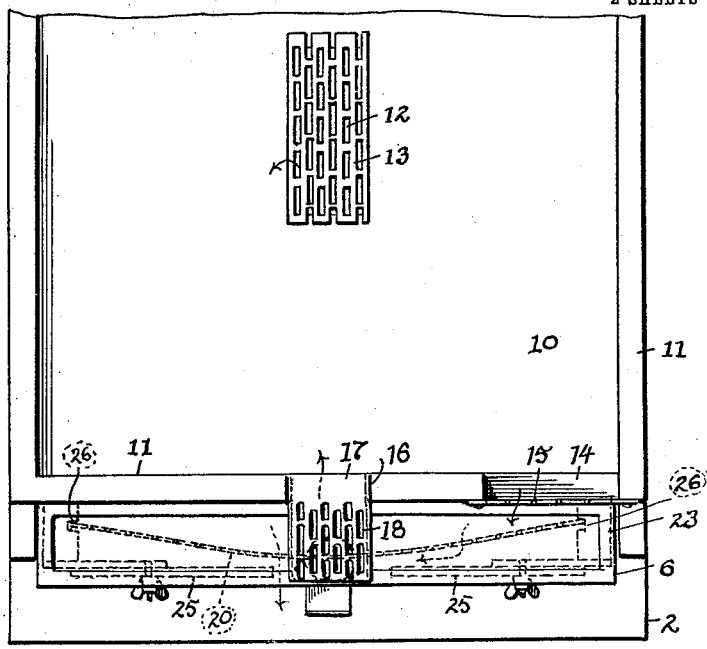
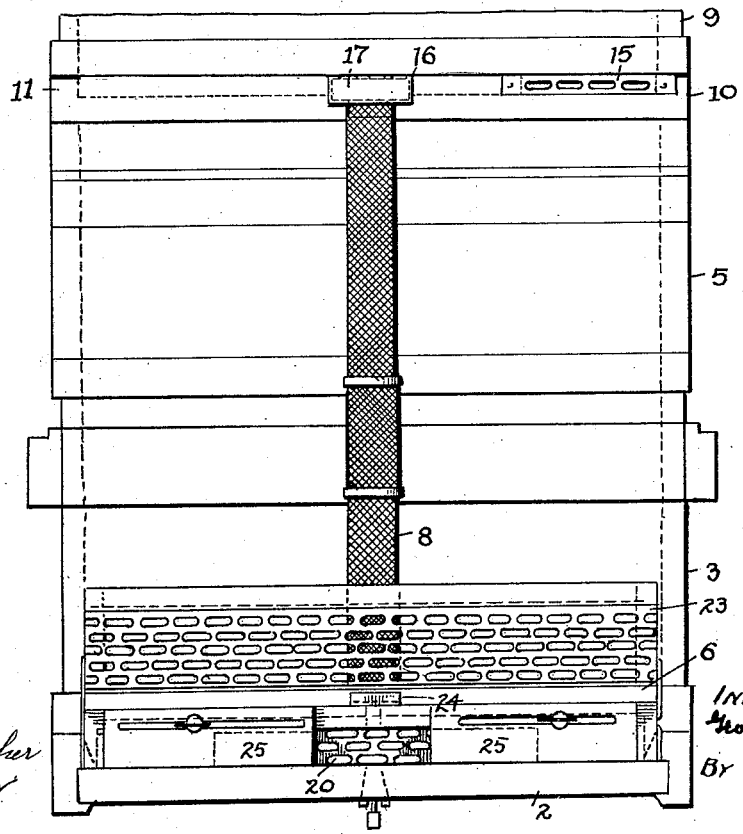

UNITED STATES PATENT OFFICE.

GEORGE C. RAHN, OF HAILEYBURY, ONTARIO, CANADA, ASSIGNOR OF ONE-HALF TO MARTIN J. O'DONNELL, OF CLEVELAND, OHIO.

BEEHIVE.

1,116,922. Specification of Letters Patent. Patented Nov. 10, 1914.

Original application filed January 23, 1913, Serial No. 743,733. Divided and this application filed July 21, 1913. Serial No. 780,380.

*To all whom it may concern:*

Be it known that I, GEORGE C. RAHN, a citizen of the United States, residing at Haileybury, in the district of Nippising, Ontario, Canada, have invented certain new and useful Improvements in Beehives, of which the following is a specification.

This application is a division of my application filed January 23, 1913, Ser. No. 743,733, for improvements in bee-hives, and the invention herein resides more particularly in the means for transferring the bees from one brood box to another when swarming, all substantially as herein shown and described and pointed out in the claims.

In the accompanying drawings, Figure 1 is a sectional view vertically through a beehive comprising two brood boxes and a super or surplus box, including my improved bee-escape board and swarming device. Fig. 2 is a plan view of the bee-escape board and other parts of the bee-hive below line 2—2, Fig. 1. Fig. 3 is a front elevation of the organization shown in Fig. 1 excepting the upper parts.

The bee-hives in general use comprise separable sections of standard size and dimension, and these sections are superposed. At the start of the honey-season the bee-hive usually consists of a bottom-board 2, a brood-box 3, and a cover 4. When the surplus honey comes a super or surplus box 5 is added. Later, when the conditions in the bee-hive cause the bees to swarm, it is of great advantage to relocate the bees at the old hive in a new brood-box without suffering any loss of the queen-bee and the workers, or loss in time and labor of the bees in gathering and storing honey.

A practical and effective way to accomplish the desired result is provided by my improved devices and arrangement of parts. In this new organization I also prefer to use an entrance box 6, such as shown and described in my letters Patent of the United States, dated February 13, 1912, and bearing Ser. No. 1,017, 233. This entrance box 6 is placed upon the bottom board 2 immediately in front of the opening 7 in brood box 3, and it serves several useful purposes as set forth in said letters patent. In the present invention box 6 has the added utility of providing a base connection for a telescopic tube 8 at the front of the bee-hive and through which the bees are transferred to the brood-box 9 by way of a bee-escape board 10 placed upon the super or surplus box 5 beneath box 9. This dividing section or so-called bee-escape board 10 is provided with a raised border-frame 11 of substantially the same width as the walls of the other box sections. An opening 12 is provided centrally of this board, which is covered by a thin perforated metal plate 13, the perforations being merely large enough for the passage of the workers of the colony and too small for the larger queen and drones. A passage 14 is also provided through the border-frame 11 near one corner at the front for the workers, this passage communicating with the outside and having a perforated guard-plate 15 secured across the same to bar the passage of the queen and the drones. Another opening 16 is provided in border-frame 11 at a central point at the front of board 10 to afford a seat for the tubular elbow 17 which forms part of the wire-mesh tube 8. The outlet end of the elbow 17 opens into the inner space of the bee-escape board when the parts are assembled as in Fig. 1, and a series of perforations 18 of a predetermined size in the top of the elbow permit only the workers to escape when trapped in tube 8. Without such means of escape, the workers would otherwise block up this passage during swarming flights of all the bees and possibly prevent the queen-bee from passing on into the upper brood box 9. Tube 8 may be made of wire-cloth, coiled wire, glass celluloid, or any material through which the bees may see through and be encouraged to move onward in their efforts to escape. The smaller bees, in other words the workers, are free to escape at the top of the tube, and in fact, the majority escape immediately through the perforated guard 20 at the front of the entrance box 6 when swarming occurs. Tube 8 may be a single piece of any suitable length to extend from entrance box 6 to the bee-escape board 10, but as shown it is in several sections telescopically united, whereby it may be shortened or extended to connect separate brood-chambers superimposed in other relations than as shown.

The lower telescopic portion of tube 8 is sleeved on the cone 21 which covers the entrance 22 to the bottom of the rectangular case 23 seated upon entrance box 6, and a slide 24 controls this passage way to the tube. Case 23 may be used as a trap to catch the drones when it is desired to get rid of them as explained in my Letters-Patent aforesaid, but removal of the top wall or plate of this case permits tube 8 to be placed over the wire-mesh outlet cone 21 when the bees are about to swarm. Then the queen-bee and drones pass upward through this tube, their exit out of the front of the entrance-box 6 being barred by the perforated guard plate 20 as the perforations therein are of a size which allow only workers to pass through. In the present invention plate 20 and its relation to the shutters 25 of the box differs from my former device in that the said plate is curved to bring its middle portion closely adjacent to the meeting ends of the two slides or shutters 25 but nevertheless sufficiently retired therefrom to afford a passage for the workers behind the slides or shutters. The advantage of this is that in swarming, the outwardly-bound queen drones naturally take a direct course for the narrow central light-opening but as they are larger than the perforations in the plate they cannot escape and consequently bar the exits at this central point. However the openings in the guard plate 20 at either side of this middle point do not become clogged as the shutters shield and darken the box opposite these points and therefore do not attract the drones and queen, but the workers are not deterred by any such conditions as they are more active and moreover can pass through the perforations. On the other hand the central location of cone 21 at the illuminated place of box 6 makes it an easy matter for the queen and drones to find this exit and they will pass upward before the swarming workers return in their efforts to find their queen. Again, if the entrance was not shielded and arranged in this manner the queen-bee might be delayed in reaching tube 8 and the upper brood-box 9 and the returning swarm would force the queen-bee back into the lower brood-box 3, a result which must be avoided.

The ends of guard plate 20 are removably seated in the vertical grooves 26 in the ends of the entrance-box 6, the plate being curved to this extent, but the said plate might be straight or of other shape and secured in any other simple way, providing that it is slightly separated from the shutters in front to permit the workers to pass in or out of the box 6 at either side of the middle or more direct passages when these become clogged by the outwardly bound bees.

The second brood-box 9 is a duplicate of the bottom box and is placed on the surplus-box 5 with the bee-escape board and the swarming tube when the conditions in the old hive indicate that the bees are about ready to swarm. When the bees swarm the queen usually goes with the swarm, but with my improved arrangement the queen is trapped with the drones and promptly directed to the new hive above. When the swarming bees return they will go of their own accord to their queen in the new brood-chamber by way of the lower brood-box and the opening 12 in the bee-escape board, and then form a new colony in the brood-box 9. The bee-keeper may then move the old brood-box to a new location or both brood-boxes can be left on the same stand by removing the queen-cells in the lower brood-box.

What I claim is:

1. In a bee-hive, a plurality of superimposed box sections having a bee-escape board removably mounted therebetween, a perforated guard centrally in the bottom of said board for the passage of the smaller bees only of the colony, a guarded entrance for the lower box section, and a swarming tube extending upwardly from said tube and open to said bee-escape board.

2. In a bee-hive, a brood-box having an entrance box provided with adjustable shutters and a tube extending upward from said entrance box, in combination with a second brood-box having open communication with the upper end of said tube.

3. In a bee-hive, separate superimposed brood-boxes having a removable bee-escape board and a removable tubular connection provided with escape-openings at its upper end for the working-bees, in combination with an entrance box for the lower brood-box having a trap opening for said tubular connection and provided with adjustable shutters at the front thereof and a perforated guard behind and spaced apart from said shutters to provide indirect passages for the bees.

In testimony whereof I affix my signature in presence of two witnesses.

GEORGE C. RAHN.

Witnesses:
ALICE C. McQUARRIE,
JAMES McQUARRIE.

Copies of this patent may be obtained for five cents each, by addressing the "Commissioner of Patents, Washington, D. C."